United States Patent [19]

Nagaoka

[11] Patent Number: 4,998,466
[45] Date of Patent: Mar. 12, 1991

[54] BULB SLITTER

[76] Inventor: Tatsuo Nagaoka, Kabushikigaisha Nagaokaseikiseisakusho c/o No. 13-12, Minowacho 2-chome, Kohoku-ku, Yokohama-shi, Kanagawa, Japan

[21] Appl. No.: 553,310

[22] Filed: Jul. 17, 1990

[30] Foreign Application Priority Data

Jan. 23, 1990 [JP] Japan .................................. 2-11880

[51] Int. Cl.⁵ ........................ A23N 7/00; A23N 15/08
[52] U.S. Cl. ........................................ 99/591; 99/516; 99/537; 99/584; 99/593
[58] Field of Search ................ 99/491, 516, 537, 538, 99/540, 543, 584, 586, 589–591, 593, 635, 636, 642, 643; 426/482, 483; 83/885, 886, 883, 876, 857

[56] References Cited

U.S. PATENT DOCUMENTS

| | | | |
|---|---|---|---|
| 1,137,841 | 5/1915 | Cookson | 99/591 |
| 2,813,297 | 11/1957 | Dahlin | 99/584 |
| 4,361,084 | 11/1982 | Raatz | 99/636 |
| 4,476,778 | 10/1984 | Clyma | 99/516 |
| 4,481,875 | 11/1984 | Toyosato | 99/584 |
| 4,545,297 | 10/1985 | Ihlow | 99/591 |
| 4,602,559 | 7/1986 | Suzuki et al. | 426/482 |
| 4,730,554 | 3/1988 | Kristiaan | 99/636 |
| 4,738,195 | 4/1988 | Berude et al. | 99/537 |
| 4,889,045 | 12/1989 | Backus | 99/516 |
| 4,889,046 | 12/1989 | Cornelissen | 99/636 |

FOREIGN PATENT DOCUMENTS

| | | |
|---|---|---|
| 48-23982 | 3/1973 | Japan . |
| 3294772 | 12/1988 | Japan .................................. 99/584 |
| 8800471 | 9/1989 | Netherlands .......................... 99/636 |

*Primary Examiner*—Timothy F. Simone
*Attorney, Agent, or Firm*—Low, Price, LeBlanc, Becker & Shur

[57] ABSTRACT

In a bulb slitter, a plurality of first swinging elements are mounted to a frame is juxtaposed relation to each other, and a plurality of second swinging elements are mounted to the frame is juxtaposed relation to each other. The first swinging elements have their respective one ends which are arranged in facing relation to one ends of the respective second swinging elements. The first and second swinging elements are mounted to the frame for angular movement toward and away from each other obliquely vertically. A plurality of first disc-like cutting edges are mounted to the one ends of the respective first swinging elements for angular movement. A plurality of second disc-like cutting edges are mounted to the one ends of the respective second swinging elements for angular movement. First biasing means is arranged at the other ends of the respective first swinging elements for biasing the one ends of the respective first swinging elements upwardly, and second biasing means is arranged at the other ends of the respective second swinging elements for biasing the one ends of the respective second swinging elements upwardly. An urging assembly is arranged above a space between the first and second swinging elements for vertical movement.

11 Claims, 6 Drawing Sheets

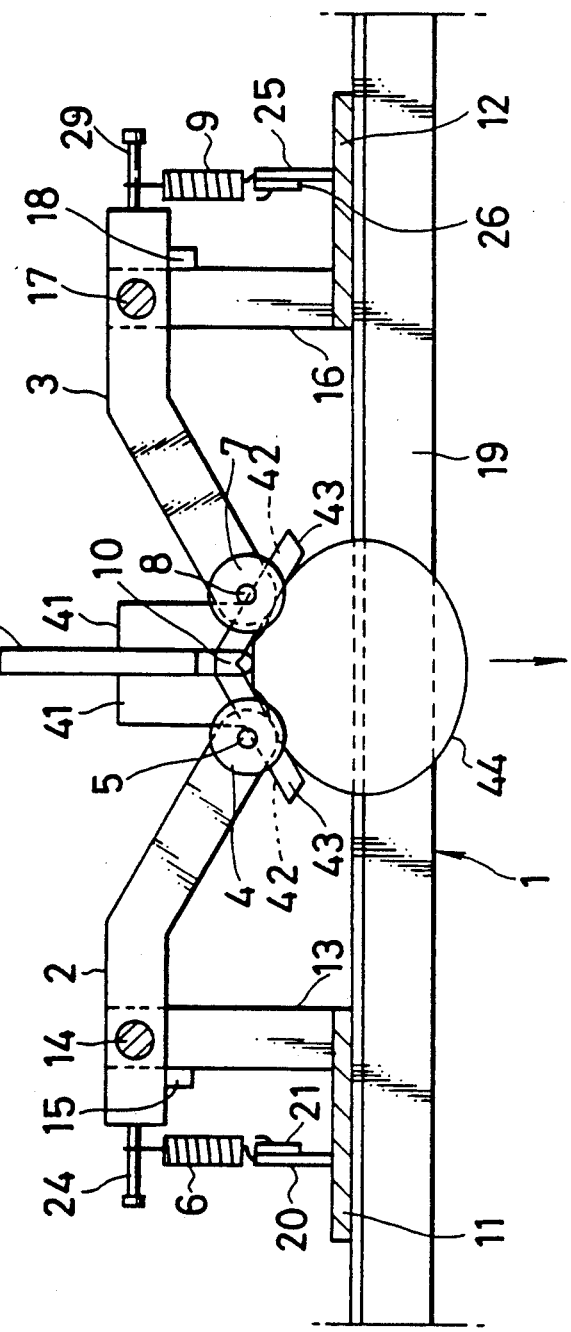

4,998,466

BULB SLITTER

BACKGROUND OF THE INVENTION

1. Field of the Invention

The present invention relates to a bulb slitter for cutting a plurality of slits into an outer cover of a bulb such as an onion, a garlic, a scallion or shallot or the like.

2. Description of the Prior Art

Generally, a bulb such as an onion, a garlic or the like has widely been used habitually as a cooking material. Prior to finely cutting the bulb, however, an outer cover at an outer periphery of the bulb, which is yellowish brown, must be peeled off. If an attempt is made to process a large quantity of bulbs, the processing must rely upon a mechanical technique.

As desquamation means of the outer cover, jet air is most effective. A peeling-off step of the coats of the bulb has been practiced in such a manner that compressed air is jetted to the bulb which is transferred to a transport station. The compressed air is jetted to the bulb resting on the transport station to peel off the outer cover of the bulb.

Further, the following automatic peeling-off apparatus has been proposed in Japanese Patent Provisional Publication No. 23982/1973. That is, a plurality of guide support rods are arranged at both sides of a base in facing ralation to each other with a suitable gap left therebetween. A spiral or helical burning shaft is arranged along a space between the guide support rods. A pair of burners are arranged outwardly of the burning shaft in facing relation to each other. An onion rests on the burning shaft. Rotation of the burning shaft rolls the onion, and the outer cover of the onion is burned by the burners while the onion is transported by the guide support rods.

In the automatic peeling-off apparatus disclosed in Japanese Patent Provisional Publication No. 23982/1973, however, the outer cover of the onion is peeled off by regular stripes on the surface of the burning shaft, and only the outer cover is burned by the burners. Accordingly, since the onion and the burning shaft are large in contact area therebetween, there is a fear that the onion is damaged.

SUMMARY OF THE INVENTION

It is therefore an object of the invention to provide a bulb slitter in which an urging assembly pushes downwardly a bulb resting on a plurality of first swinging elements and a plurality of second swinging elements, whereby one ends of the respective first swinging elements and one ends of the respective second swinging elements are moved angularly obliquely downwardly against biasing forces of respective biasing means in agreement with a configuration of the bulb, in which cutting edges are moved angularly about their respective axes while being in contact with the bulb, to cut a plurality of linear slits having their respective predetermined depths, in an outer cover of the bulb regardless of a dimension and a configuration of the bulb, in which the bulb and the cutting edges are made small in contact area, whereby there is no fear that the bulb is damaged, and in which, when the bulb falls down through gaps between the one ends of the first swinging elements and the one ends of the second swinging elements, the one ends of the respective first swinging elements and the one ends of the respective second swinging elements are moved angularly obliquely upwardly under the biasing forces of the respective biasing means, so that the first and second swinging elements can be returned to their respective waiting positions.

A bulb slitter according to the invention is arranged such that a plurality of first swinging elements are arranged on a frame in juxtaposed relation to each other, and a plurality of second swinging elements are arranged on the frame in juxtaposed relation to each other, that one ends of the respective first swinging elements and one ends of the respective second swinging elements are arranged in facing relation to each other and are movable angularly obliquely vertically toward and away from each other, that a plurality of first cutting edges are provided respectively at the one ends of the respective first swinging elements for angular movement about an axis, and a plurality of second cutting edges are provided respectively at the one ends of the respective second swinging elements for angular movement about an axis, that first biasing means is arranged at the other ends of the respective first swinging elements for biasing the one ends of the respective first swinging elements upwardly, and second biasing means is arranged at the other ends of the respective second swinging elements for biasing the one ends of the respective second swinging elements upwardly, and that an urging assembly is arranged above a space between the first swinging elements and the second swinging elements for vertical movement.

BRIEF DESCRIPTION OF THE DRAWINGS

FIG. 6 is a front elevational cross-sectional view of the principal portion of the embodiment after operation of the bulb slitter; and FIG. 7 is a front elevational view showing the bulb into which a plurality of slits are cut.

DETAILED DESCRIPTION OF THE PREFERRED EMBODIMENT

Figure 1:
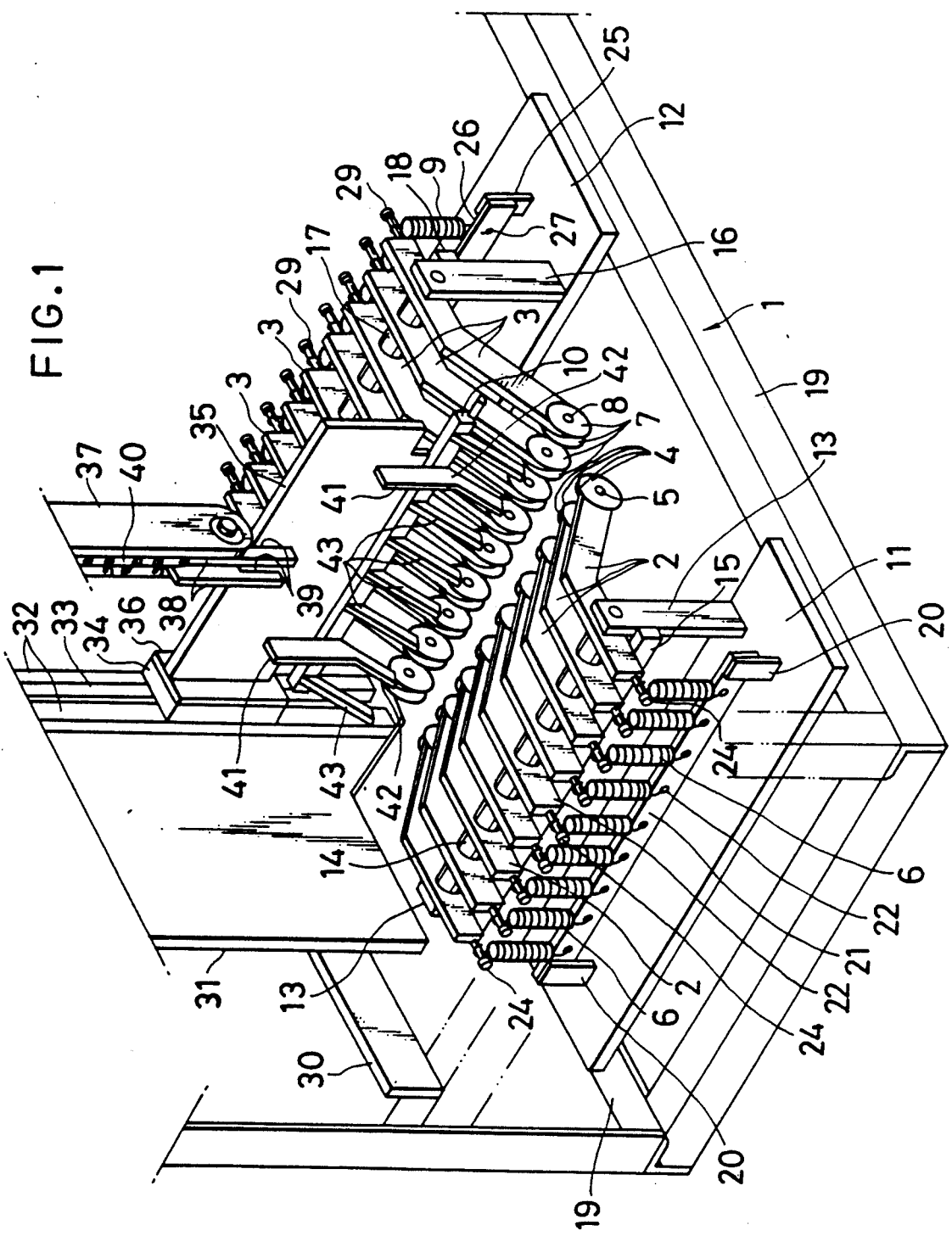
FIG. 1 is a perpective view of an embodiment of the invention.
Figure 2:
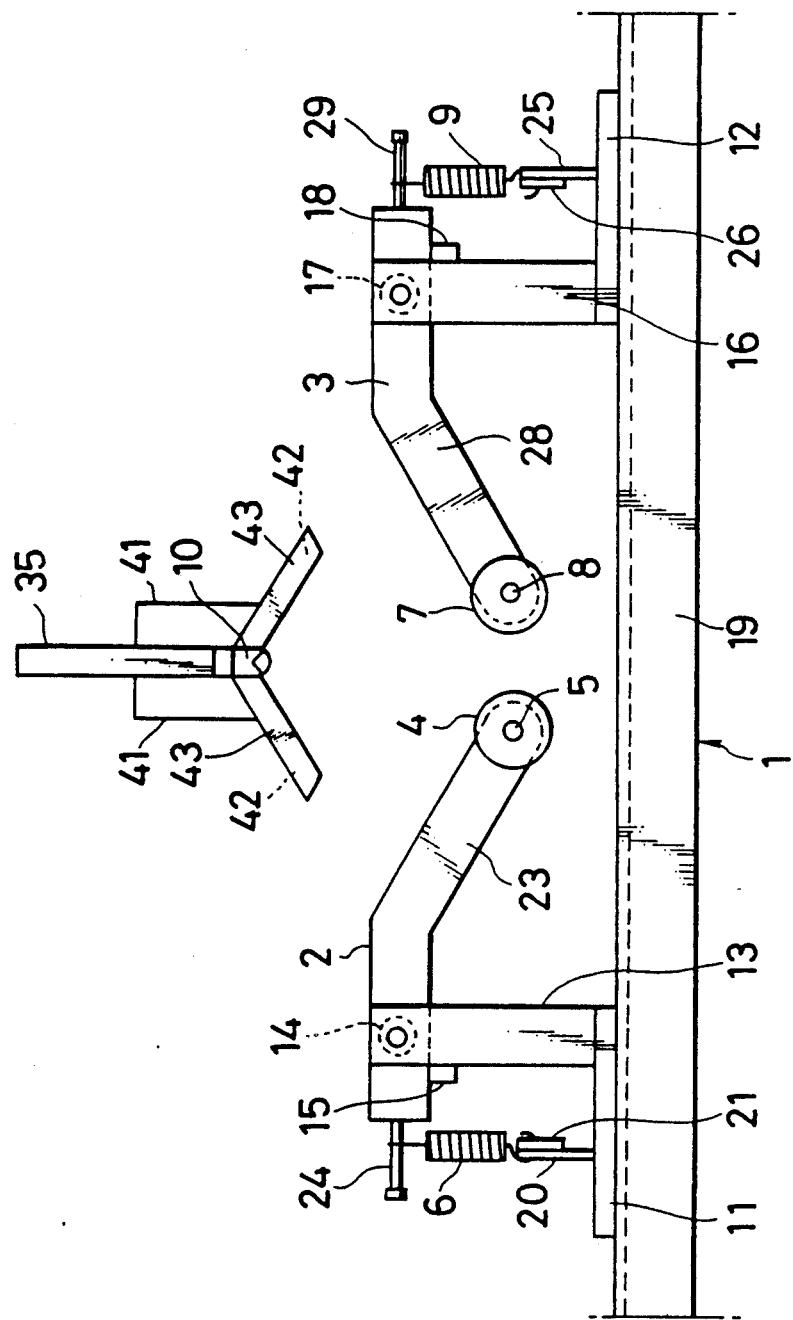
FIG. 2 is a front elevational view of a principal portion of the embodiment illustrated in FIG. 1.
Figure 3:
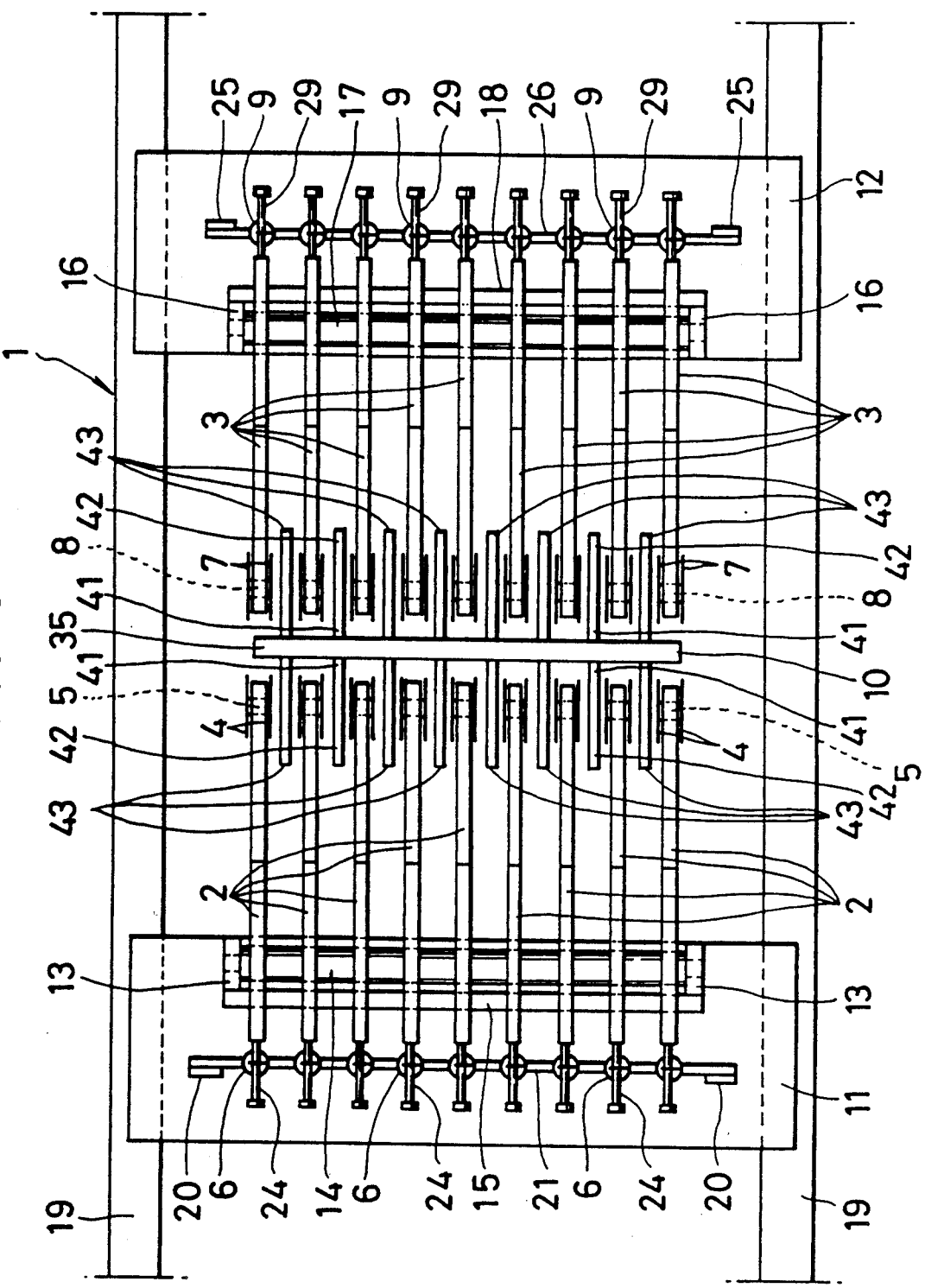
FIG. 3 is a top plan view of the embodiment illustrated in FIG. 2.

Referring to FIG. 1, there is shown a frame 1 above which a plurality of first swinging elements 2 and a plurality of second swinging elements 3 are arranged. The first swinging elements 2 are juxtaposed to each other, and the second swinging elements 3 are also juxtaposed to each other, with a predetermined gap left therebetween. The first and second swinging elements 2 and 3 are arranged such that their respective one ends face toward each other, and the one ends of the respective first and second swinging elements 2 and 3 are movable vertically obliquely toward and away from each other. As shown in FIGS. 2 and 3, a plurality of pairs of disc-like cutting edges 4 and 4 are arranged at their respective one ends of the first swinging elements 2. Each pair of cutting edges 4 and 4 are provided respectively at both sides of the one end of a corresponding one of the first swinging elements 2, through a pivot 5 for angular movement thereabout. A plurality of tension springs 6 are arranged respectively at the other ends of the respective first swinging elements 2, and serve as biasing means for biasing the one ends of the respective first swinging elements 2 upwardly.

Further, a plurality of pairs of disc-like cutting edges 7 and 7 are arranged at their respective one ends of the second swinging elements 3. Each pair of cutting edges 7 and 7 are provided respectively at both sides of the one end of a corresponding one of the second swinging elements 3, through a pivot 8 for angular movement thereabout. A plurality of tension springs 9 are arranged respectively at the other ends of the respective second swinging elements 3, and serve as biasing means for biasing the one ends of the respective second swinging elements 3 upwardly. An urging assembly 10 is arranged above a space between the first and second swinging elements 2 and 3 for vertical movement.

A pair of base plates 11 and 12 are arranged above the frame 1 and are spaced from each other. A pair of spaced posts 13 and 13 are arranged on the base plate 11 at a location adjacent an inner edge thereof in an upstanding manner. A support shaft 14 is arranged between the pair of posts 13 and 13 and extends horizontally. The support shaft 14 has its both ends which are supported respectively by the posts 13 and 13 at their respective locations adjacent the upper ends thereof.

The plurality of first swinging elements 2 juxtaposed to each other are arranged between the posts 13 and 13 in equidistantly spaced relation to each other and are supported by the support shaft 14 for angular movement thereabout. An engaging element 15 is arranged at the sides of the respective posts 13 and 13, and serves as a stopper for restricting upward movement of the first swinging elements 2 under the biasing forces of the respective tension coil springs 6. The engaging element 15 has its both ends which are fixedly mounted respectively to the side edges of the respective posts 13 and 13.

Further, as shown in FIG. 3, a pair of spaced posts 16 and 16 are arranged on the base plate 12 at a location adjacent an inner edge thereof in an upstanding manner. A support shaft 17 extending in parallel relation to the support shaft 14 is arranged between the pair of posts 16 and 16 and extends horizontally. The support shaft 17 has its both ends which are supported respectively by the posts 16 and 16 at their respective locations adjacent the upper ends thereof.

The plurality of second swinging elements 3 juxtaposed to each other are arranged between the posts 16 and 16 in equidistantly spaced relation to each other and are supported by the support shaft 17 for angular movement thereabout. An engaging element 18 is arranged at the sides of the respective posts 16 and 16, and serves as a stopper for restricting upward movement of the second swinging elements 3 under the biasing forces of the respective tension coil springs 9. The engaging element 18 has its both ends which are fixedly mounted respectively to the side edges of the respective posts 16 and 16.

The base plate 11 has its sections adjacent both ends thereof, and the base plate 12 has its sections adjacent both ends thereof. The sections of the respective base plates 11 and 12 have their respective lower surfaces which are fixedly mounted respectively to upper surfaces of respective side frame elements 19 and 19.

A pair of side support plates 20 and 20 are arranged on the base plate 11 in an upstanding manner at respective locations facing toward the sides of the respective posts 13 and 13. A receiving plate 21 is mounted to sides of the respective side support plates 20 and 20 adjacent the respective posts 13 and 13. A plurality of anchoring bores 22 are formed in the receiving plate 21 at locations corresponding respectively to the first swinging elements 2. The receiving plate 21 has its both ends which are fixedly mounted respectively to the side faces of the respective side support plates 20 and 20.

The first swinging elements 2 have their respective downwardly inclined sections 23 at locations facing respectively toward the second swinging element 3. A plurality of anchoring pins 24 are provided respectively at the other ends of the respective first swinging elements 2 and project respectively from the other ends of the respective first swinging elements 2. The tension coil springs 6 have their respective upper ends which are anchored respectively to the anchoring pins 24 in a caught manner. The lower ends of the respective tension coil springs 6 are anchored respectively to the anchoring bores 22 in the receiving plate 21 in a caught manner.

Further, a pair of side support plates 25 and 25 are arranged on the base plate 12 in an upstanding manner at respective locations facing toward the sides of the respective posts 16 and 16. A receiving plate 26 is mounted to sides of the respective side support plates 25 and 25 adjacent the respective posts 16 and 16. A plurality of anchoring bores 27 are formed in the receiving plate 26 at locations corresponding respectively to the second swinging elements 3. The receiving plate 26 has its both ends which are fixedly mounted respectively to the side faces of the respective side support plates 25 and 25.

The second swinging elements 3 have their respective downwardly inclined sections 28 at locations facing respectively toward the first swinging element 2. A plurality of anchoring pins 29 are provided respectively at the other ends of the respective second swinging elements 3 and project respectively from the other ends of the respective second swinging elements 3. The tension coil springs 9 have their respective upper ends which are anchored respectively to the anchoring pins 29 in a caught manner. The lower ends of the respective tension coil springs 9 are anchored respectively to the anchoring bores 27 in the receiving plate 26 in a caught manner.

As shown in FIG. 1, a connecting element 30 extending horizontally is arranged above one of the pair of side frame elements 19 of the frame 1. A fixed or stationary plate 31 is arranged on a side face of the connecting element 30. A plurality of guide elements 32 and 32 are arranged on the stationary plate 31 and extend in equidistantly spaced parallel relation to each other. A guide groove 33 is defined between the guide elements 32 and 32 and extends vertically. A slidable element 34 is arranged in the guide groove 33 for vertical movement therealong. A movable plate 35 is vertically mounted to the slidable element 34 through a holding plate 36. The movable plate 35 is arranged in facing relation to an upper location of the space between the one ends of the respective first swinging elements 2 and the one ends of the respective second swinging elements 3.

A stopper (not shown) is provided at the lower ends of the respective guide elements 32 and 32 for restricting downward movement of the slidable element 34.

A support arm 37 is arranged above the movable plate 35 and extends in parallel relation to the guide element 32. A plurality of holder plates 38 and 38 are arranged at the side of the support arm 37 adjacent the lower end thereof. The holder plates 38 and 38 are formed therein with their respective fitting grooves 39. The movable plate 35 has its upper edge which is fitted in the fitting grooves 39 in the respective holder plates 38 and 38. The holder plates 38 and 38 are fixedly mounted to the movable plate 35. The movable plate 35 is connected to the support arm 37 through the holder plates 38 and 38.

A roller chain 40 is arranged at the side of the support arm 37, and serves as transport means movable vertically. The roller chain 40 has its lower end which is connected to the upper ends of the respective holder plates 38 and 38. A sprocket (not shown) is in mesh with the roller chain 40. A motor (not shown) serving as a drive unit has its shaft which is connected to the sprocket.

The elongated urging assembly 10 is arranged below the movable plate 35 at a location corresponding to the space between the one ends of the respective first swinging elements 2 and the one ends of the respective second swinging elements 3. The urging assembly 10 is connected to the movable plate 35 through a plurality of connecting plates 41. The connecting plates 41 have their respective lower ends which are formed respectively with abutment pieces 42 inclined downwardly. Each of selected ones of the abutment pieces 42 is arranged at a location between a corresponding pair of the plurality of first swinging elements 2 and 2, and each of the remaining abutment pieces 42 is arranged at a location between a corresponding pair of the plurality of second swinging elements 3 and 3.

Further, a plurality of abutment plates 43 are arranged on both sides of the urging assembly 10 in spaced relation to each other. The abutment plates 43 are so inclined that their respective forward ends are directed downwardly. Each of selected ones of the abutment plates 43 is arranged at a location between a corresponding pair of the plurality of first swinging elements 2 and 2, and each of the remaining abutment plates 43 is arranged at a location between a corresponding pair of the plurality of second swinging elements 3 and 3.

The operation of the embodiment will next be described below.

Figure 4:
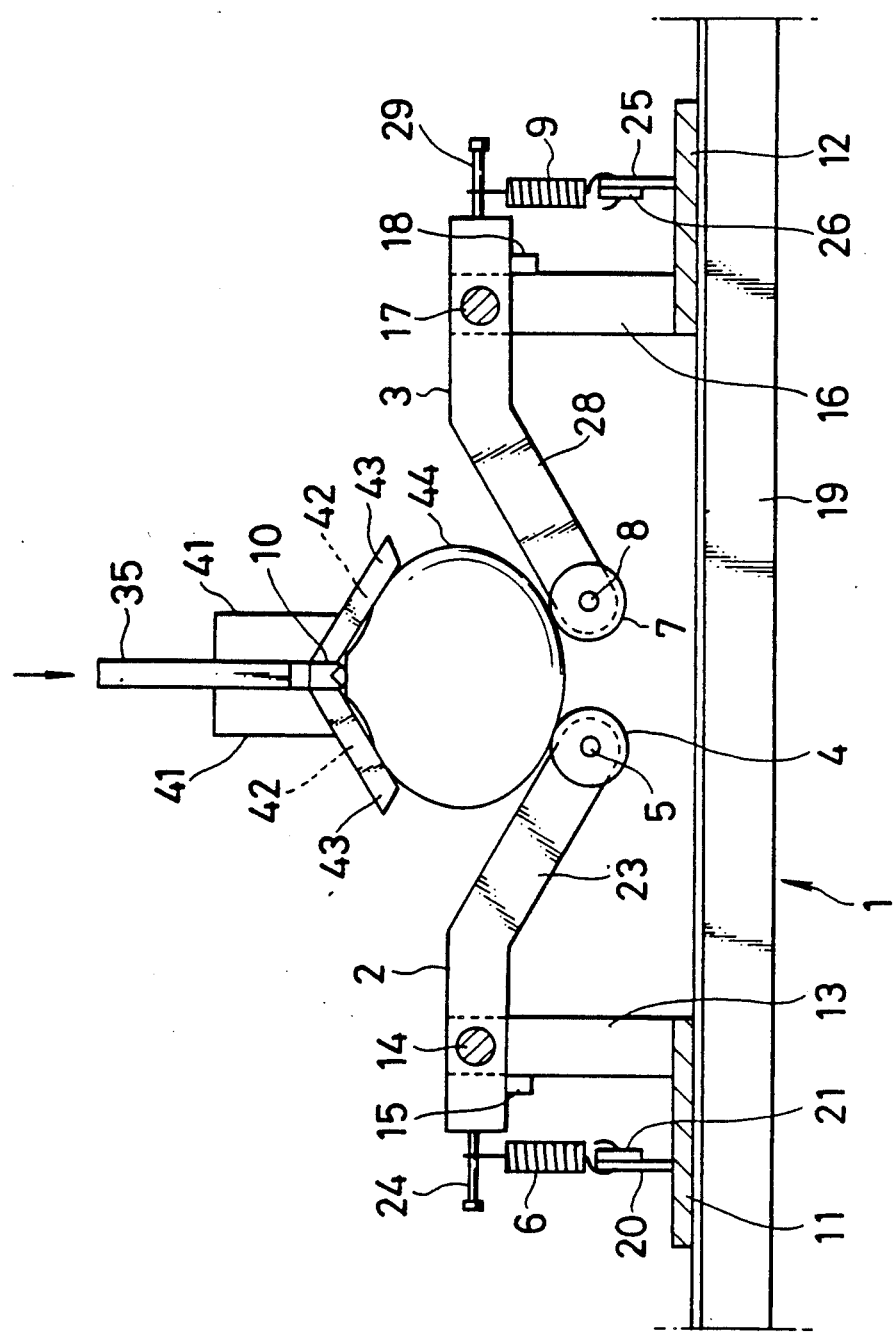
FIG. 4 is a front elevational cross-sectional view of a principal portion of the embodiment at the time of operation of a bulb slitter.

First, as shown in FIG. 4, an onion 44 is supplied, by supply means (not shown), to a space among the urging assembly 10, the inclined sections 23 of the respective first swinging elements 2 and the inclined sections 28 of the respective second swinging elements 3, so that the onion 44 rests on the swinging elements 2 and 3. Subsequently, when the motor is driven, the sprocket is revolved by the motor. By the revolving of the sprocket, the roller chain 40 moves the holder plates 38 and 38 downwardly together with the support arm 37.

By the downward movement of the holder plates 38 and 38 by the roller chain 40, the slidable element 34 is slidingly moved downwardly along the guide groove 33 between the guide elements 32 and 32. The movable plate 35 is moved downwardly along the guide elements 32 and 32. Simultaneously, the urging assembly 10 is moved downwardly toward the upper end of the onion 44 together with the movable plate 35. The abutment plates 43 of the urging assembly 10 and the abutment pieces 42 of the respective connecting plates 41 are abutted against the outer periphery of the upper end of the onion 44.

Further, the abutment plates 43 of the urging assembly 10 and the abutment pieces 42 of the respective connecting plates 41 urge the onion 44 downwardly, whereby the cutting edges 4 of the first swinging elements 2 and the cutting edges 7 of the swinging elements 3 cut a portion of the outer cover of the onion 44 at the lower end thereof. Subsequently, the one ends of the respective first swinging elements 2 are moved angularly obliquely downwardly in the direction indicated by the arrow a in FIG. 5 against the tension forces of the tension coil springs 6, while moving in agreement with the configuration of the onion 44. Simultaneously, the one ends of the respective second swinging elements 3 are moved angularly obliquely downwardly in the direction indicated by the arrow b in FIG. 5 against the tension forces of the tension coil springs 9, while moving in agreement with the configuration of the onion 44. The first and second swinging elements 2 and 3 are moved angularly in directions opposite to each other, about the respective support shafts 14 and 17.

Figure 5:
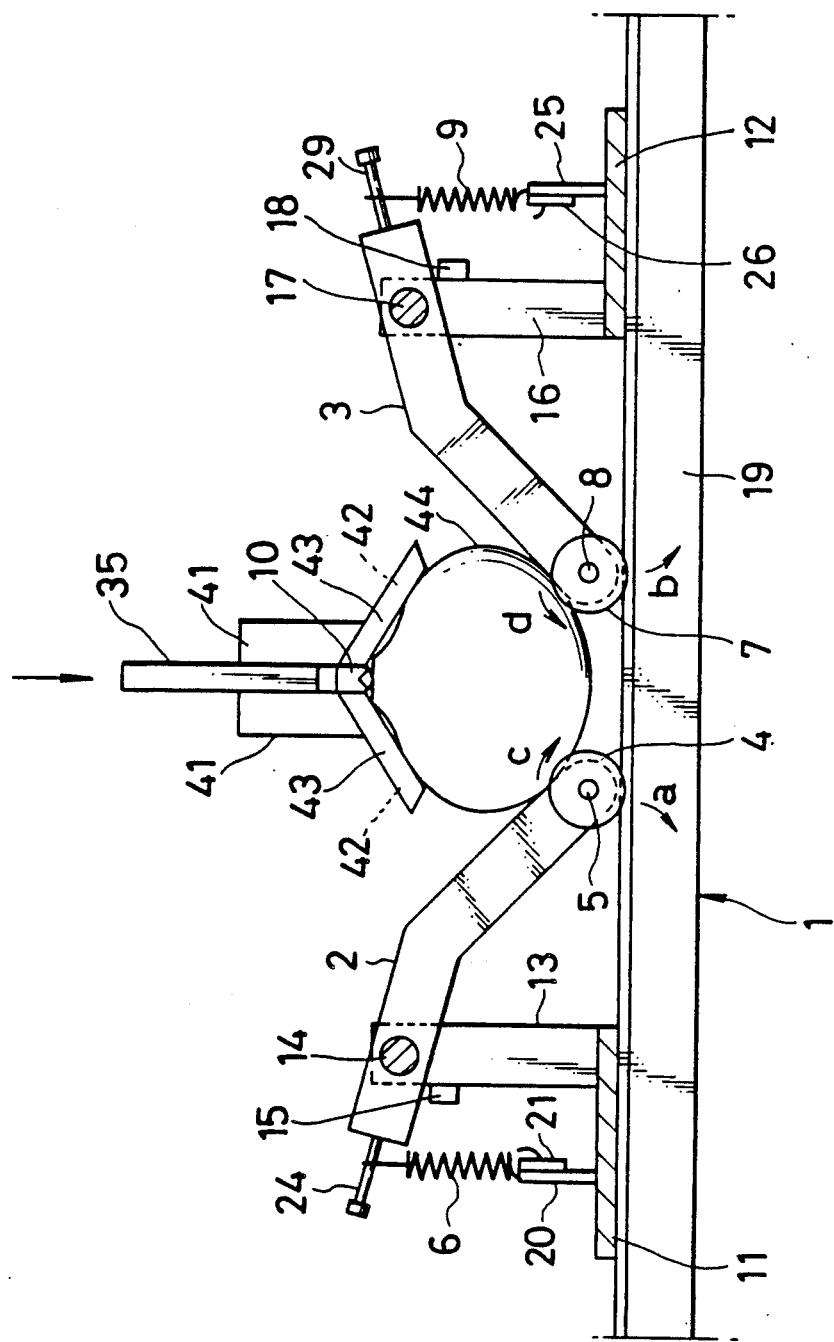
FIG. 5 is a front elevational cross-sectional view of the principal portion of the embodiment during operation of the bulb slitter.

Further, by the obliquely downward angular movement of the one ends of the respective first swinging elements 2 and the one ends of the respective second swinging elements 3, the cutting edges 4 of the first swinging elements 2 are moved angularly about the pivot 5 in the direction indicated by the arrow c in FIG. 5, while being in contact with the onion 44 and, simultaneously, the cutting edges 7 of the second swinging elements 3 are moved angularly about the pivot 8 in the direction indicated by the arrow d in FIG. 5, while being in contact with the onion 44. Thus, the cutting edges 4 and 7 cut a plurality of linear slits 45 (refer to FIG. 7) into the outer cover of the onion 44 from the lower end thereof toward the upper end thereof, by their respective predetermined depths which are equal to differences between the cutting edges 4 and 7 and the outer peripheral surfaces of the one ends of the first and second swinging elements 2 and 3.

Subsequently, as shown in FIG. 6, when the urging assembly 10 is located between the one ends of the first swinging elements 2 and the one ends of the second swinging elements 3, and when the abutment plates 43 and the abutment pieces 42 are located between the first swinging elements 2 and between the second swinging elements 3, the onion 44 having its outer cover into which the plurality of slits 45 are cut as shown in FIG. 7 falls downwardly through the space between the one ends of the respective first swinging elements 2 and the one ends of the respective second swinging elements 3.

The onion 44 having its outer cover into which the slits 45 are cut by the cutting edges 4 and 7 is transported to a peeling-off apparatus (not shown) for the bulb at the subsequent step.

When the onion 44 falls down through the space between the one ends of the respective first swinging elements 2 and the one ends of the respective second swinging elements 3, the one ends of the respective first swinging elements 2 are moved angularly obliquely upwardly under the tension forces of the respective tension coil springs 6 and, simultaneously, the one ends of the respective second swinging elements 3 are moved angularly obliquely upwardly under the tension forces of the respective tension coil springs 9. The engaging element 15 stops the angular movement of the first swinging elements 2 about the support shaft 14, while the engaging element 18 stops the angular movement of the second swinging elements 3 about the support shaft 17.

Furthermore, the sprocket is revolved reversely by the motor, and the revolution of the sprocket causes the roller chain 40 to move the holder plates 38 and 38 upwardly together with the support arm 37.

Moreover, by the upward movement of the holder plates 38 and 38 by the roller chain 40, the slidable element 34 is slidingly moved upwardly along the guide groove 33 between the guide elements 32 and 32. The movable plate 35 is moved upwardly along the guide elements 32 and 32. Simultaneously, the urging assembly 10 is moved upwardly together with the movable plate 35. The urging assembly 10 is returned to its original waiting position which corresponding to the location above the space between the one ends of the first swinging elements 2 and the one ends of the second swinging elements 3.

What is claimed is:

1. A bulb slitter comprising a frame, a plurality of first swinging elements mounted to said frame in juxtaposed relation to each other, a plurality of second swinging elements mounted to said frame in juxtaposed relation to each other, said first swinging elements having their respective one ends which are arranged in facing relation to one ends of the respective second swinging elements, said first and second swinging elements being mounted to said frame for angular movement toward and away from each other obliquely vertically, a plurality of first disc-like cutting edges mounted to said one ends of the respective first swinging elements for angular movement about an axis connecting said one ends of the respective first swinging elements to each other, a plurality of second disc-like cutting edges mounted to said one ends of the respective second swinging elements for angular movement about an axis connecting said one ends of the respective second swinging elements to each other, first biasing means arranged at the other ends of the respective first swinging elements for biasing the one ends of the respective first swinging elements upwardly, second biasing means arranged at the other ends of the respective second swinging elements for biasing the one ends of the respective second swinging elements upwardly, and an urging assembly arranged above a space between said first swinging elements and said second swinging elements for vertical movement.

2. The bulb slitter according to claim 1, further comprising a first pair of posts arranged on said frame, a second pairs of posts arranged on said frame, a first shaft extending horizontally and supported by said first pair of posts, and a second shaft extending horizontally and supported by said second pair of posts, wherein said first and second swinging elements are mounted respectively on said first and second shafts for angular movement thereabout in spaced relation to each other.

3. The bulb slitter according to claim 2, wherein said first and second pairs of posts have their respective stoppers for the first and second swinging elements.

4. The bulb slitter according to claim 1, wherein said first swinging elements have their respective inclined sections at locations facing respectively toward said second swinging elements, and said second swinging section have their respective inclined sections at said locations.

5. The bulb slitter according to claim 1, further comprising a plurality of abutment plates which are arranged respectively on both sides of said urging assembly.

6. The bulb slitter according to claim 5, wherein said abutment plates have their respective forward ends which are inclined downwardly.

7. The bulb slitter according to claim 6, wherein said abutment plates are extensible and retractable with respect to spaces between said first swinging elements and spaces between said second swinging elements.

8. The bulb slitter according to claim 7, further comprising a plurality of connecting plates and a movable plate extending vertically, said urging assembly being mounted to said movable plate through said connecting plates.

9. The bulb slitter according to claim 8, wherein said connecting plates are formed respectively with abutment pieces which are inclined downwardly.

10. The bulb slitter according to claim 8, further comprising a plurality of stationary guide elements, said movable plate being mounted to said guide elements for vertical movement.

11. The bulb slitter according to claim 8, further comprising a chain movable vertically, said movable plate being connected to said chain.

* * * * *